(12) United States Patent
Kaneda et al.

(10) Patent No.: US 7,610,595 B2
(45) Date of Patent: Oct. 27, 2009

(54) CLAMPING PLATE, CARTRIDGE CASE, INFORMATION MEDIUM, MOLD, AND METHOD OF MANUFACTURING CLAMPING PLATE

(75) Inventors: Hiroshi Kaneda, Tokyo (JP); Masaru Ikebe, Tokyo (JP); Kenji Hashizume, Tokyo (JP)

(73) Assignee: TDK Corporation, Tokyo (JP)

( * ) Notice: Subject to any disclaimer, the term of this patent is extended or adjusted under 35 U.S.C. 154(b) by 432 days.

(21) Appl. No.: 11/462,865

(22) Filed: Aug. 7, 2006

(65) Prior Publication Data

US 2007/0039016 A1    Feb. 15, 2007

(30) Foreign Application Priority Data

Aug. 9, 2005   (JP)   ............... 2005-230673

(51) Int. Cl.
   *G11B 23/03*    (2006.01)
(52) U.S. Cl. .................................... 720/723
(58) Field of Classification Search ............... 720/723, 720/725, 728, 645, 704, 634, 733, 763, 710; 360/133; 369/282, 291
   See application file for complete search history.

(56) References Cited

U.S. PATENT DOCUMENTS

| | | | |
|---|---|---|---|
| 4,926,676 A | 5/1990 | Bailey et al. | |
| 6,910,219 B2 * | 6/2005 | Okazawa et al. | 720/741 |
| 7,114,166 B2 | 9/2006 | Hashizume et al. | |
| 2005/0076355 A1 * | 4/2005 | Yamada et al. | 720/725 |
| 2005/0216929 A1 | 9/2005 | Hashizume et al. | |
| 2005/0251818 A1 | 11/2005 | Hashizume et al. | |
| 2006/0026624 A1 | 2/2006 | Hashizume et al. | |
| 2006/0169817 A1 | 8/2006 | Sasaki et al. | |

FOREIGN PATENT DOCUMENTS

| | | |
|---|---|---|
| EP | 1191533 A | 3/2002 |
| JP | 2003-091955 | 3/2003 |
| JP | 2003-091955 A | 3/2003 |
| JP | 2004-188473 A | 7/2004 |

OTHER PUBLICATIONS

English language Abstract of JP 2003-091955 A, Mar. 28, 2003.
English language Abstract of JP 2004-188473 A, Jul. 8, 2004.
English Language Abstract of JP 2003-091955.
U.S. Appl. No. 11/419,315 to Kaneda et al., which was filed on May 19, 2006.
U.S. Appl. No. 11/422,155 to Kaneda et al., which was filed on Jun. 5, 2006.
U.S. Appl. No. 11/459,534 to Kaneda et al., which was filed on Jul. 24, 2006.
U.S. Appl. No. 10/571,090 to Hashizume, which was filed on Mar. 8, 2006.

* cited by examiner

*Primary Examiner*—Allen T Cao
(74) *Attorney, Agent, or Firm*—Greenblum & Bernstein, P.L.C.

(57) ABSTRACT

A clamping plate capable of reliably clamping a disk-shaped medium. In the clamping plate, at an imaginary intersecting portion between an imaginary extended surface of a rear surface of an outer peripheral portion of a main body and an imaginary extended surface of a rear surface of an inner peripheral wall of the main body, an annular groove recessed from the imaginary extended surfaces in the directions of the thicknesses of the outer peripheral portion and the inner peripheral wall is formed along an imaginary cross line of the imaginary extended surfaces.

7 Claims, 5 Drawing Sheets

CLAMPING PLATE, CARTRIDGE CASE, INFORMATION MEDIUM, MOLD, AND METHOD OF MANUFACTURING CLAMPING PLATE

BACKGROUND OF THE INVENTION

1. Field of the Invention

The present invention relates to a clamping plate capable of clamping a disk-shaped medium by attracting the medium e.g., by a drive shaft of a disk drive, a cartridge case including the clamping plate, an information medium including the cartridge case and the disk-shaped medium, a mold for manufacturing the clamping plate, and a method of manufacturing the clamping plate.

2. Description of the Related Art

As a clamping plate of this kind, there is known a clamping plate for a disk cartridge, disclosed in Japanese Laid-Open Patent Publication (Kokai) No. 2003-91955. This clamping plate is mounted on an inner side of an upper shell as a component of a cartridge housing via a clamping plate holder, such that the clamping plate is movable in a vertical direction. Further, when the disk cartridge is loaded in an information recording/reproducing device, the clamping plate is magnetically attracted toward a turntable of the information recording/reproducing device to thereby clamp a disk-shaped recording medium accommodated within the cartridge housing on the turntable. In this case, the clamping plate is comprised of a circular bottom formed by pressing a magnetic metal plate made e.g., of stainless steel, a frustoconical peripheral wall formed along the outer periphery of the bottom, and a flange portion provided on a large-diameter side of the peripheral wall. Further, a frustoconical recess into which the foremost end of a shaft of the turntable is inserted is formed in a central portion of the bottom, and an annular protrusion for holding the surface of the disk-shaped recording medium is formed on the periphery of the bottom.

SUMMARY OF THE INVENTION

From the study of the above-described clamping plate, the present inventors found out the following problem: When the disk cartridge is loaded in the information recording/reproducing device, the foremost end of the shaft of the turntable is inserted into the recess formed in the central portion of the bottom, and the clamping plate is magnetically attracted toward the turntable to thereby clamp the disk-shaped recording medium on the turntable. In this case, to cause the foremost end of the shaft to be inserted into the recess in the bottom such that the center of the clamping plate and the center of the shaft coincide with each other, the recess is formed to have a frustoconical shape. On the other hand, the clamping plate is manufactured by pressing the magnetic metal plate made e.g., of stainless steel. In general, a bent portion of the metal plate material is rounded, assuming that a metal plate material is bent by pressing. Therefore, when the bent portion is desired to be formed into a sharp shape, or even when rounding of the bent portion is desired to be reduced, it is difficult to form the bent portion as desired. Therefore, when the recess is formed in the bottom of the clamping plate by pressing, even if the rim of an opening of the recess 502 of the clamping plate 501 is desired to be formed into a shape with a small radius of curvature, as indicated by a broken line in FIG. 10, actually, the rim is formed into a shape with a large radius indicated by a solid line in FIG. 10, and the clamping plate 501 is formed with the rim of the opening of the recess 502 in its entirety being withdrawn toward the outer periphery of the clamping plate 501. It should be noted that in the FIG. 10, illustration of the cartridge housing is omitted. In this case, in the disk cartridge using the above-described clamping plate 501, assuming, for example, that the shaft 503 of the turntable and the clamping plate 501 approach each other with the shaft 503 being displaced from the clamping plate 501 in a direction indicated by an arrow in the FIG. 10, the foremost end of the shaft 503 is sometimes brought into abutment with the rim of the opening of the recess 502 with the foremost end remaining displaced, before the whole foremost end of the shaft 503 enters the recess 502. For this reason, the clamping plate 501 suffers from the problem that the disk-shaped recording medium is clamped, with the center of the clamping plate and the center of the shaft being eccentric from each other, and that the resulting eccentricity can cause insufficient clamping of the optical disc.

The present invention has been made in view of these problems, and a main object thereof is to provide a clamping plate capable of reliably clamping a disk-shaped medium, a cartridge case including the clamping plate, and an information medium including the cartridge case and a disk-shaped medium. Further, it is another main object of the present invention to provide a mold and a clamping plate manufacturing method which are capable of manufacturing the clamping plate.

To attain the above main object, a clamping plate according to the present invention includes a main body comprising: a recess circular in plan view formed in a central portion thereof, the recess having an inner peripheral wall inclined such that the recess is gradually reduced in diameter from an opening toward a bottom thereof; and an outer peripheral portion formed by an annular plate body such that the outer peripheral portion surrounds the opening, wherein the main body has a groove formed at an imaginary intersecting portion between an imaginary extended surface of a rear surface of the outer peripheral portion and an imaginary extended surface of a rear surface of the inner peripheral wall, along an imaginary line of intersection of the two imaginary extended surfaces the groove being recessed from the two imaginary extended surfaces.

To attain the above main object, a cartridge case according to the present invention comprises the clamping plate, and a case body configured to rotatably accommodate a disk-shaped medium, the case body having the clamping plate rotatably disposed on a top surface thereof.

To attain the above main object, an information medium according to the present invention comprises the cartridge case and the disk-shaped medium accommodated in the cartridge case.

According to the clamping plate, the cartridge case, and the information medium, the groove recessed from the two imaginary extended surfaces is formed along the imaginary line of intersection of the imaginary extended surfaces at the imaginary intersecting portion between the imaginary extended surface of the rear surface of the outer peripheral portion of the main body and the imaginary extended surface of the rear surface of the inner peripheral wall of the main body, whereby a portion of a plate material forming the main body, which has been formed with the groove, can be made thinner than the other portion of the plate material by the depth of the groove. This makes it possible to easily deform the portion of the plate material formed with the groove. Therefore, for example, when the clamping plate is manufactured by pressing the plate material with a mold, the shape of a molding surface of the mold for forming the rim of the recess of the main body can be accurately traced onto the plate material, thereby making it possible to form the main body such that the rim of the recess is formed at a prescribed location which is not withdrawn toward the outer periphery of the main body. Accordingly, even if the foremost end of a drive shaft approaches the recess of the clamping plate with the center of the drive shaft of a drive unit and the center of the clamping plate being displaced from each other, the foremost end of the drive shaft can be inserted into the recess while the clamping plate is moved such that the center of the drive shaft and the center of the clamping plate become coincident with each other. This makes it possible to reliably prevent the disk-shaped medium from being clamped, with the center of the clamping plate and the center of the drive shaft being eccentric from each other, and the resulting eccentricity from causing insufficient clamping of the optical disc.

The groove may be formed such that the groove is gradually reduced in groove width toward the bottom. With this configuration, compared e.g., with a construction in which the groove is formed to have a shape rectangular in cross section and a uniform groove width, it is possible to enhance the strength of the portion (rim of the opening) of the main body, which is formed with the groove.

The groove may be formed such that a maximum depth thereof is within a range of 10% to 50% of a thickness of a portion of the main body other than a portion formed with the groove. With this configuration, it is possible to form the main body such that it has a thickness small enough to facilitate deformation of the plate material when manufacturing the clamping plate by pressing the plate material, and at the same time large enough to secure a sufficient strength of the portion (rim of the opening) of the main body, which is formed with the groove.

To attain the above other main object, a mold according to the present invention is configured to manufacture a clamping plate by pressing a plate material, the clamping plate including a main body comprising: a recess circular in plan view formed in a central portion thereof, the recess having an inner peripheral wall inclined such that the recess is gradually reduced in diameter from an opening toward a bottom thereof; and an outer peripheral portion formed by an annular plate body such that the outer peripheral portion surrounds the opening, wherein the mold comprises a first forming surface that forms a rear surface of the outer peripheral portion, and a second forming surface that forms a rear surface of the inner peripheral wall, and wherein the mold has a protrusion formed at an imaginary intersecting portion of an imaginary extended surface of the first forming surface and an imaginary extended surface of the second forming surface, along an imaginary line of intersection of the two imaginary extended surfaces, the protrusion protruding from the two imaginary extended surfaces.

To attain the above other main object, a method of manufacturing a clamping plate by pressing a plate material according to the present invention, the clamping plate including a main body comprising: a recess circular in plan view formed in a central portion thereof, the recess having an inner peripheral wall inclined such that the recess is gradually reduced in diameter from an opening toward a bottom thereof; and an outer peripheral portion formed by an annular plate body such that the outer peripheral portion surrounds the opening, wherein the clamping plate is manufactured by pressing a protrusion of a mold against the plate material, the mold comprising a first forming surface that forms a rear surface of the outer peripheral portion, and a second forming surface that forms a rear surface of the inner peripheral wall, the protrusion being formed at an imaginary intersecting portion of an imaginary extended surface of the first forming surface and an imaginary extended surface of the second forming surface, along an imaginary line of intersection of the two imaginary extended surfaces, the protrusion protruding from the two imaginary extended surfaces.

With the mold and the clamping plate manufacturing method according to the present invention, the protrusion is formed at the imaginary intersecting portion of the imaginary extended surface of the first forming surface and the imaginary extended surface of the second forming surface, along the imaginary line of intersection of the imaginary extended surfaces in a manner protruding from the imaginary extended surfaces, and the clamping plate is manufactured by pressing the protrusion against the plate material, whereby a groove can be formed at the imaginary intersecting portion of the main body of the clamping plate. Therefore, the portion of the plate material, which is formed with the groove, can be made thinner than the other portion by the depth of the groove, thereby making it possible to easily deform the portion formed with the groove. Further, it is possible to press in a portion against which the protrusion is pressed, toward a molding surface of the mold for forming the rim of the recess of the main body, by a strong force. Therefore, the shape of the molding surface of the mold for forming the rim of the recess of the main body can be accurately traced onto the plate material, thereby making it possible to form the main body such that the rim of the recess is formed at a prescribed location which is not withdrawn toward the outer periphery of the main body. Accordingly, even if the foremost end of a drive shaft approaches the recess of the clamping plate, with the center of the drive shaft of a drive unit and the center of the clamping plate being displaced from each other, the foremost end of the drive shaft can be inserted into the recess while the clamping plate is moved such that the center of the drive shaft and the center of the clamping plate become coincident with each other. This makes it possible to reliably prevent the disk-shaped medium from being clamped, with the center of the clamping plate and the center of the drive shaft being eccentric from each other, and the resulting eccentricity from causing insufficient clamping.

It should be noted that the present disclosure relates to the subject matter included in Japanese Patent Application No. 2005-230673 filed Aug. 9, 2005, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Now, the best mode for carrying out the invention will be described with reference to the accompanying drawings.

First, a description will be given of the construction of a disk cartridge 1 with reference to the drawings.

Figure 1:
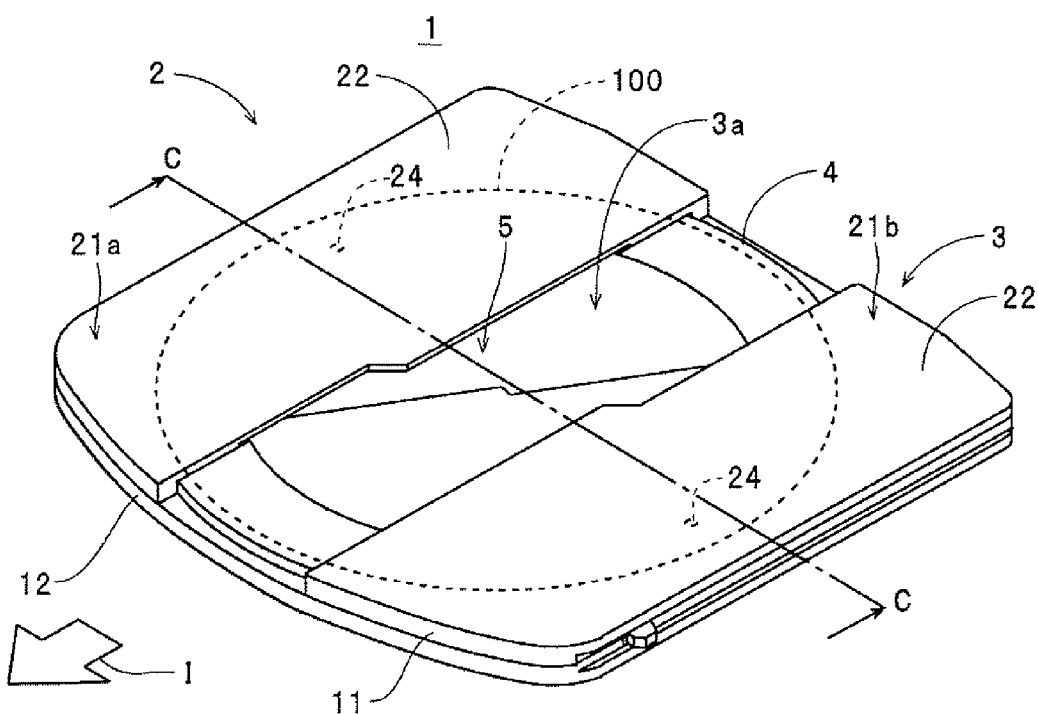
FIG. 1 is an external perspective view of a disk cartridge.
Figure 2:
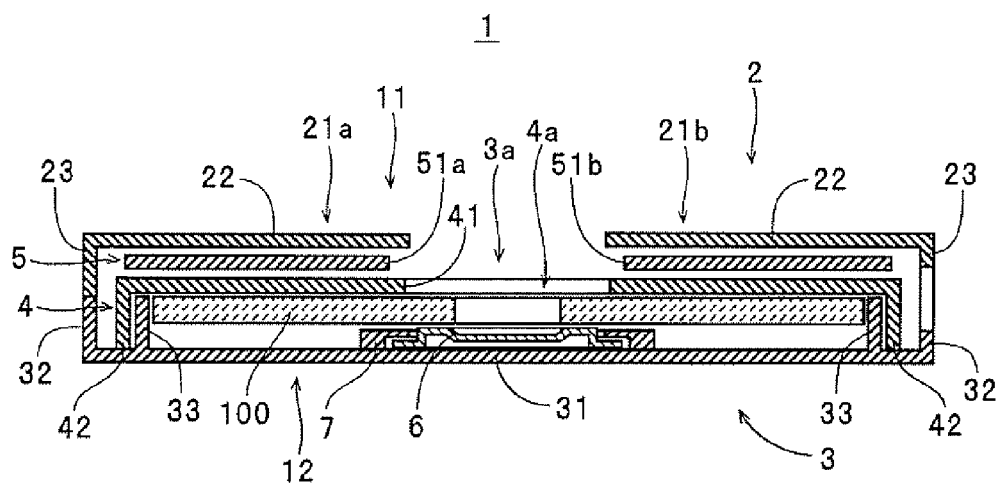
FIG. 2 is a cross-sectional view taken on line C-C of FIG. 1.

As shown in FIGS. 1 and 2, the disk cartridge 1 is a cartridge-type information medium configured to be capable of recording and reproducing various data, and is comprised of a cartridge case 2 and an optical disc 100. It should be noted that in FIG. 2, the size of the disk cartridge 1 in the direction of thickness thereof is exaggerated for ease of understanding the present invention. In this case, the optical disc 100, which corresponds to a disk-shaped medium in the present invention, is a single-sided rewritable disk-shaped medium, for example, and rotatably accommodated in the cartridge case 2. Further, as described hereinafter, the optical disc 100 is sandwiched between a clamping plate 6 mounted to the cartridge case 2 and the foremost end of a drive shaft 401 (see FIG. 9) of a drive unit, whereby the optical disc 100 is clamped on the drive shaft 401.

On the other hand, the cartridge case 2 is an example of the cartridge case according to the present invention. Referring to FIGS. 1 and 2, the cartridge case 2 is comprised of a case body 3, an inner rotor 4, a shutter 5, and the clamping plate 6. As shown in FIGS. 1 and 2, the case body 3 is comprised of a lower shell 11 and an upper shell 12 which can be fitted to each other. It should be noted that in the FIGS. 1 and 2, the lower shell 11 is shown in a state where the lower shell 11 faces upward for ease of understanding the present invention.

As shown in FIGS. 1 and 2, the lower shell 11 is comprised of a pair of lower shell bodies 21a and 21b. Each of the lower shell bodies 21a and 21b includes a bottom board 22 forming the bottom of the case body 3, and side walls 23 erected on the outer periphery of the bottom board 22 such that they form the sides of the case body 3. Further, the lower shell bodies 21a and 21b are configured such that they form a disk access opening 3a between the respective bottom boards 22 of the lower shell bodies 21a and 21b when the lower shell bodies 21a and 21b are fitted to the upper shell 12 (in a state where the lower shell bodies 21a and 21b are integrated with the upper shell 12). Further, as shown in FIG. 1, a protrusion 24 is erected on each of the bottom boards 22 of the lower shell bodies 21a and 21b. The protrusions 24 are inserted into respective associated slits 53 (see FIG. 4) of the shutter 5 so as to cause the shutter 5 to be slid in accordance with the pivotal motion of the inner rotor 4.

Referring to FIG. 2, the upper shell 12 is comprised of a top board 31 forming the top surface of the case body 3, side walls 32 erected on the outer periphery of the top board 31 such that the side walls 32 form the sides of the case body 3 together with the side walls 23 of the lower shell 11, and partition walls 33, which are circular in plan view and are erected on the peripheral portion of the top board 31 to form, within the case body 3, an accommodating space, which is circular in plan view and is configured to rotatably accommodate the optical disc 100. Further, as shown in FIG. 2, the clamping plate 6 is mounted on the central portion of the top board 31 of the upper shell 12 by an annular mounting member 7.

Figure 3:
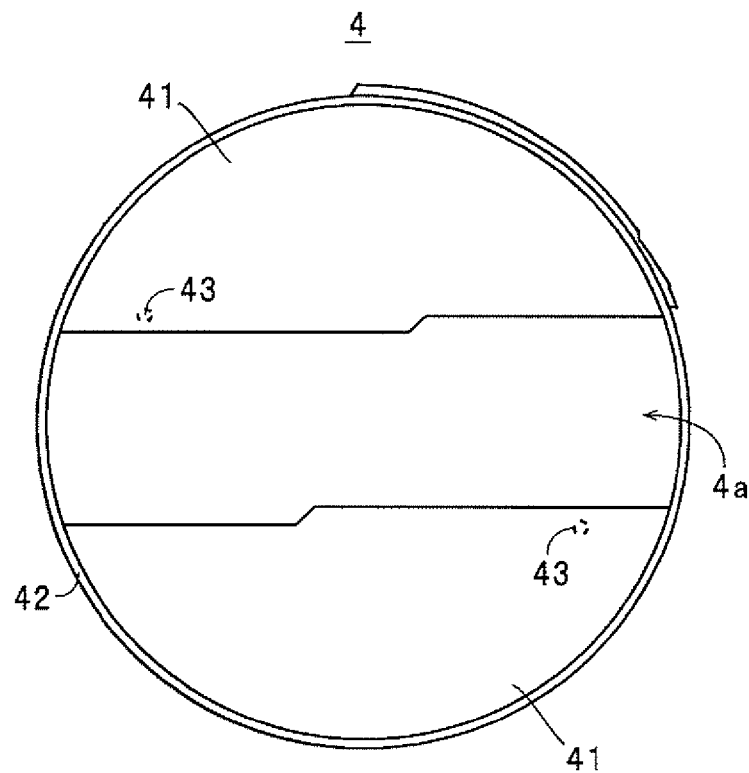
FIG. 3 is a plan view of an inner rotor, as viewed from an inner side thereof.

Referring to FIG. 3, the inner rotor 4 is shallow plate shaped such that it can carry the optical disc 100, and is comprised of a circular-plate-shaped bottom board 41 formed with an opening 4a, and side walls 42 erected on the outer periphery of the bottom board 41. As shown in FIG. 2, the inner rotor 4 is rotatably accommodated within the case body 3. In this case, the opening 4a is formed to have approximately the same shape as that of the opening 3a of the lower shell 11 so as to permit disk access from the drive unit to the optical disc 100 within the case body 3 during recording and reproducing of data. Further, protrusions 43 for axially supporting the shutter 5 are erected on the lower surface of the bottom board 41 (surface on the rear side of the sheet of FIG. 4).

Figure 4:
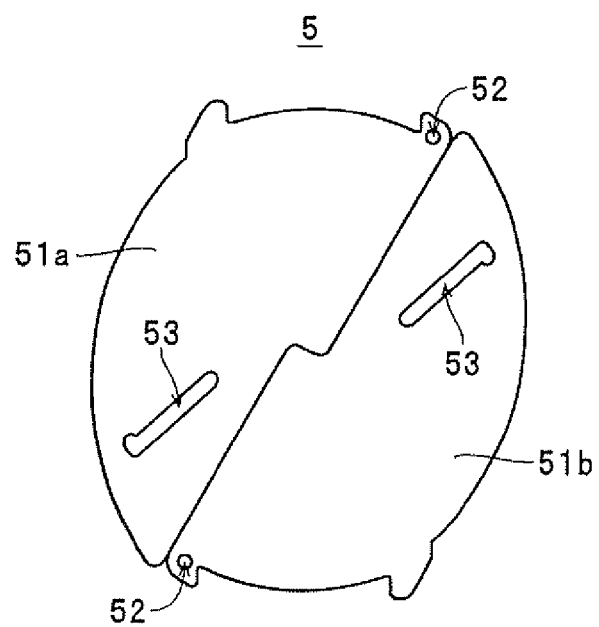
FIG. 4 is a plan view of a shutter, as viewed from a lower shell.

Referring to FIG. 4, the shutter 5 is comprised of a pair of shutter members 51a and 51b. In this case, each of the shutter members 51a and 51b has an insertion hole 52 formed on one end thereof for permitting insertion of the associated protrusion 43 of the inner rotor 4, and a slit 53 formed on the other end thereof for permitting insertion of the associated protrusion 24 of the lower shell 11. In this case, as shown in FIG. 2, the shutter 5 is disposed in the case body 3 so as to be sandwiched between the bottom board 22 of the lower shell 11 and the bottom board 41 of the inner rotor 4. Further, when the disk cartridge 1 is loaded in the drive unit, and the inner rotor 4 is pivotally moved, the shutter members 51a and 51b of the shutter 5 are pivotally moved about the respective associated insertion holes 52 in accordance with the pivotal move of the inner rotor 4.

Figure 5:
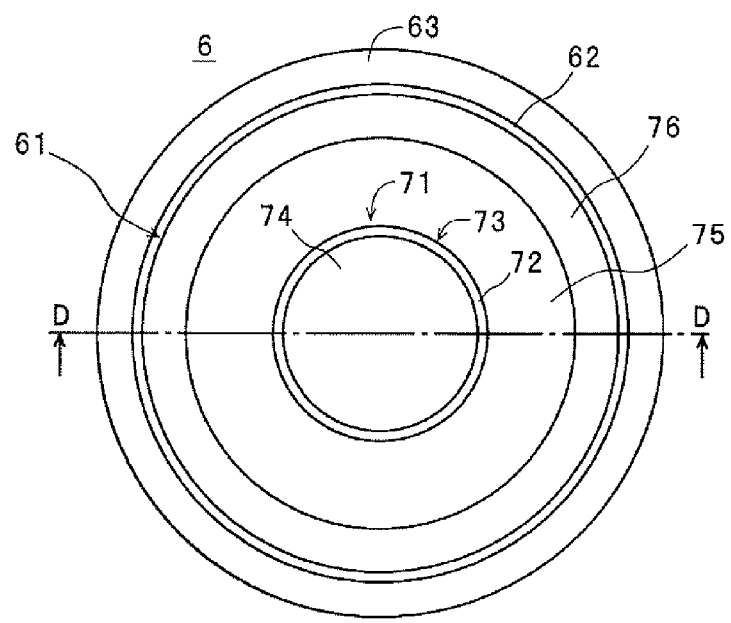
FIG. 5 is a plan view of a clamping plate.
Figure 6:
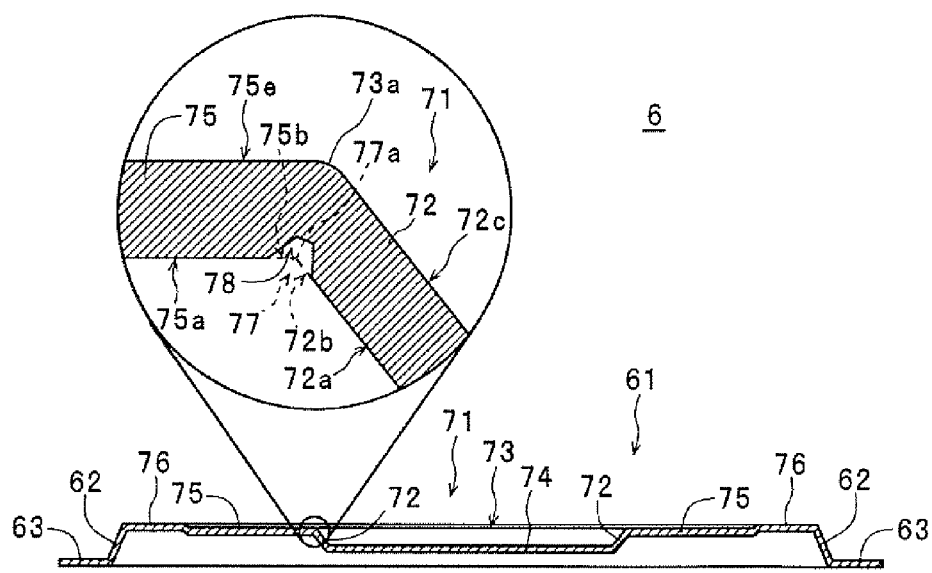
FIG. 6 is a cross-sectional view taken on line D-D of FIG. 5.
Figure 7:
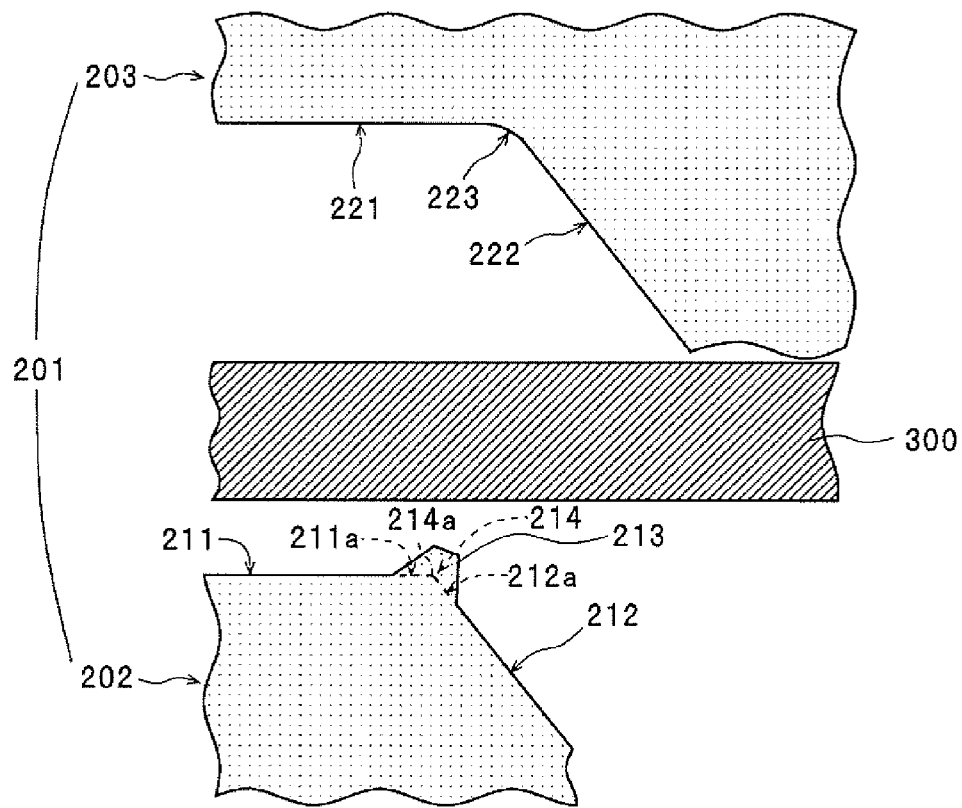
FIG. 7 is a cross-sectional view of a mold and a magnetic metal plate.

The clamping plate 6 is formed by pressing a magnetic metal plate 300 appearing in FIG. 7 (plate material in the present invention: a stainless plate having a thickness of approximately 0.3 mm, for example) such that it has a generally flanged hat-like shape as shown in FIGS. 5 and 6. More specifically, the clamping plate 6 is comprised of a main body 61, an outer peripheral wall 62, and a flange portion 63, which are integrally formed with each other. In this case, as shown in FIG. 2, the flange portion 63 is held by the mounting member 7 fixed to the top board 31 of the upper shell 12, whereby the clamping plate 6 is mounted on the top board 31 in a state where the clamping plate is slightly movable in a direction toward or away from the top board 31 and rotatable relative to the top board 31. Further, the clamping plate 6 is magnetically attracted by the drive shaft 401 of the drive unit thereby clamping the optical disc 100 between the main body 61 thereof and the foremost end of the drive shaft 401.

Referring to FIGS. 5 and 6, the main body 61 is configured to be circular in plan view, and has a central portion formed with a recess 71 circular in plan view into which the foremost end of the drive shaft 401 of the drive unit is inserted. In this case, as shown in FIG. 6, the inner peripheral wall 72 of the recess 71 is formed by an inclined wall inclined such that the diameter of the recess 71 is gradually reduced from an opening 73 (rim 73a) toward a bottom 74 thereof (downward, as viewed in FIG. 6). Further, the main body 61 is configured such that an outer peripheral portion 75 formed by an annular plate body surrounds the opening 73 of the recess 71. Further, the main body 61 is configured such that a protrusion 76 annular in plan view, which is brought into abutment with the surface of the optical disc 100 when the optical disc 100 is sandwiched, is formed outward of the outer peripheral portion 75.

Furthermore, as shown in FIG. 6, the main body 61 is configured such that at an imaginary intersecting portion 77 of an imaginary extended surface 75b of a rear surface 75a of the outer peripheral portion 75 and an imaginary extended surface 72b of a rear surface 72a of the inner peripheral wall 72 of the recess 71, a groove 78 annular in plan view, recessed from the imaginary extended surfaces 75b and 72b in the directions of the thicknesses of the outer peripheral portion 75 and the inner peripheral wall 72, is formed along an imaginary line 77a of intersection of the imaginary extended surfaces 75b and 72b. In this case, the groove 78 is formed to have a trapezoid-like shape in cross section, by way of example, a groove width of which is gradually reduced toward the bottom of the groove 78. Further, the groove 78 is formed such that a maximum depth thereof is equal to approximately 30% of the thickness of a portion of the main body 61 (thickness of the magnetic metal plate 300: e.g. approximately 0.3 mm) other than a portion of the main body 61 formed with the groove 78. Here, when the maximum depth of the groove 78 is less than 10% of the thickness of the other portion, it becomes difficult to deform a portion of the main body 61, which is to be formed with the rim 73a, when the magnetic metal plate 300 is pressed during manufacturing of the clamping plate 6, as described hereinafter. Further, when the maximum depth of the groove 78 is more than 50% of the thickness of the other portion, it becomes difficult to secure a sufficient strength of the portion of the main body 61, which is formed with the rim 73a. Therefore, the depth of the groove 78 is preferably defined to be within a range of 10% to 50% of the thickness of the other portion.

The outer peripheral wall 62 is configured to have a hollow cylindrical shape, and is formed along the outer periphery of the main body 61 continuously formed therewith. Further, as shown in FIG. 6, the outer peripheral wall 62 is formed by an inclined wall which is inclined such that the outer peripheral wall 62 is gradually increased in diameter as it becomes more distant from the main body 61 (toward the flange portion 63). The flange portion 63 is configured to have an annular shape, and is formed along the outer peripheral wall 62 continuously formed therewith in a manner surrounding the end (lower end as viewed in FIG. 6) of the outer peripheral wall 62.

Next, a description will be given of the construction of the mold 201 shown in FIG. 7, and the method of manufacturing the clamping plate 6 using the mold 201. It should be noted that in FIGS. 7 and 8 referred to hereinafter, only the essential parts of the mold 201 are illustrated for ease of understanding the present invention.

Referring to FIG. 7, the mold 201 is an example of the mold according to the present invention, and is configured to be capable of manufacturing the clamping plate 6 by pressing the magnetic metal plate 300. More specifically, as shown in FIG. 7, the mold 201 is comprised of a lower mold 202, and an upper mold 203. The lower mold 202 includes a forming surface 211 (corresponding to a first forming surface in the present invention) that forms the rear surface 75a of the outer peripheral portion 75 of the main body 61, and a forming surface 212 (corresponding to a second forming surface in the present invention) that forms the rear surface 72a of the inner peripheral wall 72 of the recess 71 of the main body 61, and is configured such that the lower mold 202 can form the inner surface (lower surface as viewed in FIG. 7) of the clamping plate 6. Further, the lower mold 202 includes an annular protrusion 213 for forming the groove 78 of the main body 61 of the clamping plate 6. In this case, as shown in FIG. 7, at an imaginary intersecting portion 214 of an imaginary extended surface 211a of the forming surface 211 and an imaginary extended surface 212a of the forming surface 212, the protrusion 213 is formed along an imaginary line 214a of intersection of the imaginary extended surfaces 211a and 212a in a manner protruding obliquely outward from the imaginary extended surfaces 211a and 212a. Further, the protrusion 213 is formed to have a trapezoid-like shape in cross section, by way of example, a lateral width of which is gradually reduced toward the foremost end of the protrusion 213. Furthermore, the protrusion 213 has a maximum height (maximum amount of protrusion) defined to be equal to approximately 30% of the thickness of the magnetic metal plate 300 for use in manufacturing the clamping plate 6 (e.g., approximately 0.09 mm). On the other hand, the upper mold 203 has a forming surface 221 that forms a front surface 75c of the outer peripheral portion 75 of the main body 61, and a forming surface 222 that forms a front surface 72c of the inner peripheral wall 72 of the recess 71 of the main body 61, and is configured to be capable of forming an outer surface (upper surface as viewed in FIG. 6) of the clamping plate 6. In this case, the radius of curvature of a corner 223 formed by the forming surfaces 221 and 222 is defined to be equal to approximately 0.5 mm, for example.

Figure 8:
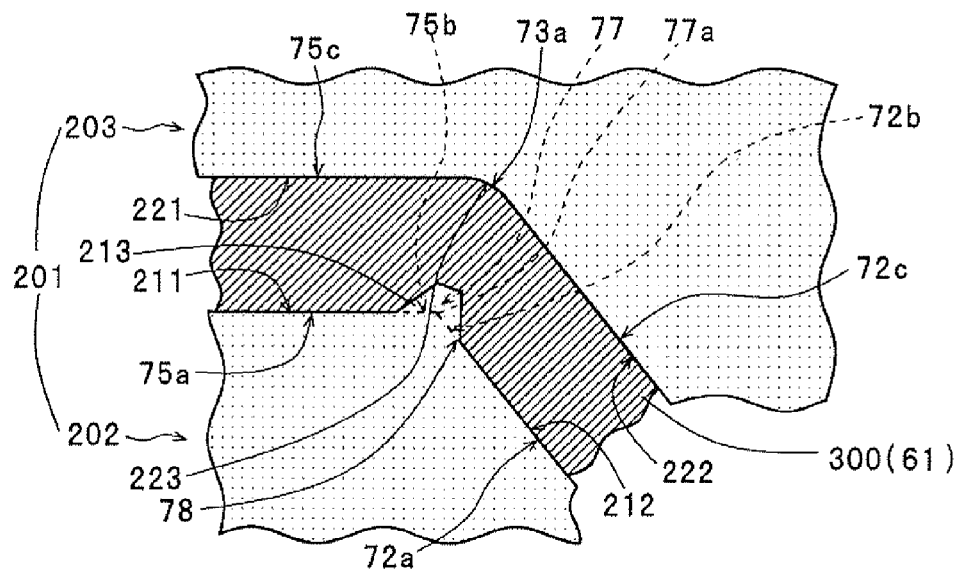
FIG. 8 is a diagram useful in explaining a method of manufacturing the clamping plate.

When the clamping plate 6 is manufactured by using the mold 201, the lower mold 202 is mounted on a fixed mounting portion of a pressing machine, and the upper mold 203 is mounted on a movable mounting portion of the pressing machine. Then, as shown in FIG. 7, the magnetic metal plate 300 is disposed between the lower mold 202 and the upper mold 203, and the pressing machine is activated. Subsequently, the upper mold 203 mounted on the movable mounting portion is moved toward the lower mold 202 to sandwich the magnetic metal plate 300 between the upper mold 203 and the lower mold 202. In doing this, as shown in FIG. 8, the magnetic metal plate 300 is bent along the forming surfaces 211 and 212 of the lower mold 202 and the forming surfaces 221 and 222 of the upper mold 203, whereby the main body 61 of the clamping plate 6 is formed. In this case, the forming surfaces 211 and 212 of the lower mold 202 form the rear surface 75a of the outer peripheral portion 75 and the rear surface 72a of the inner peripheral wall 72, of the main body 61, respectively. Further, the forming surfaces 221 and 222 of the upper mold 203 form the front surface 75c of the outer peripheral portion 75 and the front surface 72c of the inner peripheral wall 72, of the main body 61, respectively. Further, the protrusion 213 of the lower mold 202 is pressed against the magnetic metal plate 300, whereby as shown in FIG. 8, the annular groove 78 having a trapezoid-like shape in cross section and a maximum depth approximately equal to the maximum height (approximately 0.09 mm, in the illustrated example) of the protrusion 213 is formed in the imaginary intersecting portion 77 of the imaginary extended surface 75b of the rear surface 75a and the imaginary extended surface 72b of the rear surface 72a, along the imaginary line 77a of intersection of the imaginary extended surfaces 75b and 72b. Here, when the groove 78 is formed, the portion of the magnetic metal plate 300 formed with the groove 78 is made thinner than the other portion of the magnetic metal plate 300 by the depth of the groove 78, which makes it easier to carry out deforming presswork on the portion formed with the groove 78. Further, since the groove 78 has a trapezoid-like shape in cross section the groove width of which is gradually reduced toward the bottom of the groove 78, the strength of the portion (rim 73a of the opening 73) of the main body 61 formed with the groove 78 is enhanced when compared e.g., with a construction in which a groove 78 rectangular in cross section is formed. Furthermore, this portion is pressed in toward the corner 223 of the upper mold 203 by a strong force applied by pressing the protrusion 213. Therefore, the shape of the corner 223 of the upper mold 203 is accurately traced on the magnetic metal plate 300, so that the rim 73a of the opening 73 of the recess 71 is formed such that it has a radius of curvature approximately equal to the radius of curvature of the corner 223. That is, the rim 73a is formed at a prescribed location which is not withdrawn toward the outer periphery (toward the protrusion 76) of the main body 61.

Next, a method of using the disk cartridge 1 will be described with reference to drawings.

As shown in FIG. 1, when the disk cartridge 1 is removed from the drive unit, that is, when the disk cartridge 1 is not in use, the opening 3a of the case body 3 and the opening 4a of the inner rotor 4 are closed by the shutter members 51a and 51b of the shutter 5. On the other hand, when the disk cartridge 1 is loaded in the drive unit, the disk cartridge 1 is drawn into the unit by the drive unit in a direction indicated by an arrow I. It should be noted that although in FIG. 1, the lower shell 11 is shown in the state where the lower shell faces upward, the disk cartridge 1 is loaded in the drive unit with the upper shell 12 facing upward when the disk cartridge 1 is actually used. When the disk cartridge 1 is loaded in the drive unit, the inner rotor 4 is pivotally moved by a shutter opening/closing means of the drive unit, and as shown in FIG. 2, the shutter members 51a and 51b of the shutter 5 are pivotally moved relative to the inner rotor 4 to thereby open the openings 3a and 4a. Thus, the optical disc 100 is exposed, thereby permitting disk access from the outside of the case body 3 to the optical disc 100.

Figure 9:
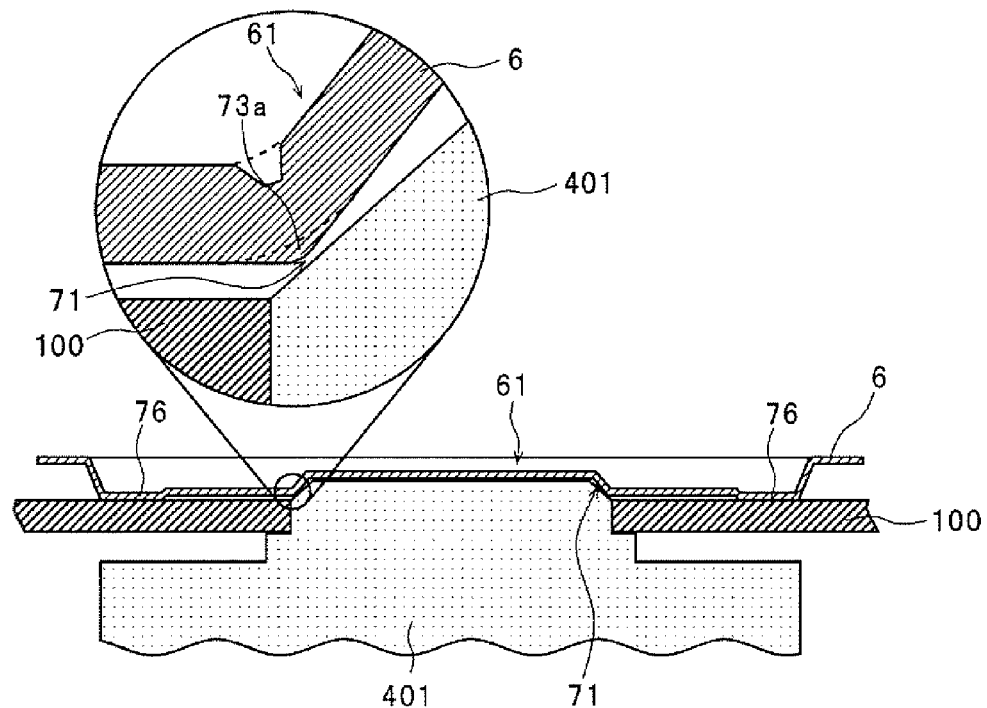
FIG. 9 is a diagram useful in explaining clamping of an optical disc by the clamping plate and a drive shaft.
Figure 10:
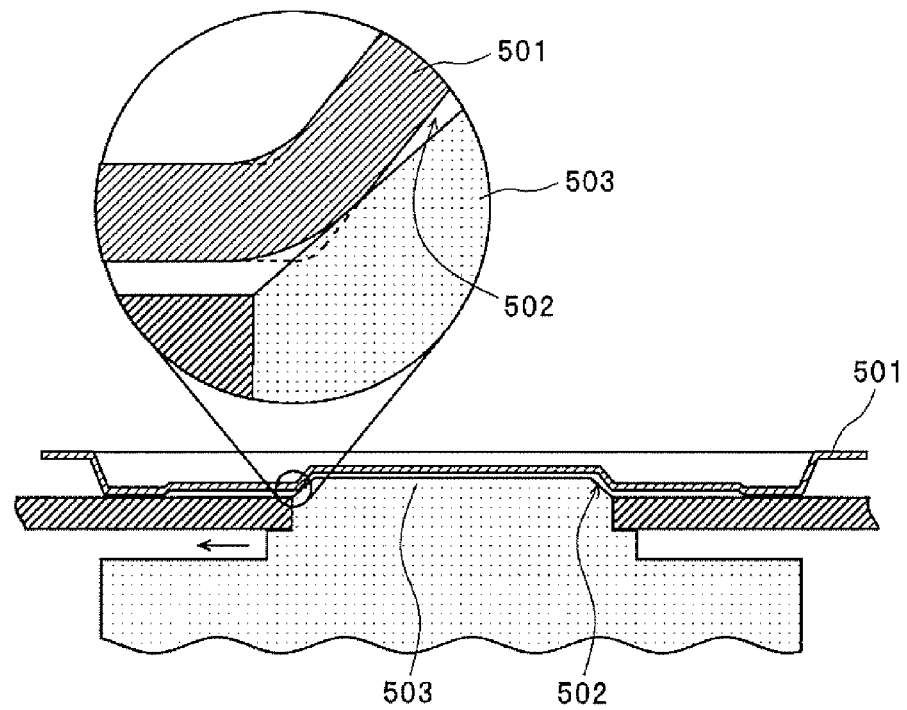
FIG. 10 is a diagram useful in explaining a state of a disk-shaped medium clamped on a turntable by a conventional clamping plate.

Then, as shown in FIG. 9 (in which illustration of the case body 3 is omitted), the clamping plate 6 is magnetically attracted by the drive shaft 401 of the drive unit to thereby clamp the rim of a central hole of the optical disc 100. More specifically, the protrusion 76 of the main body 61 of the clamping plate 6 is brought into abutment with the rim of the central hole of the optical disc 100 to thereby press the optical disc 100 toward the drive shaft 401 for clamping the rim of a central hole of the optical disc 100. In this case, in the clamping plate 6 of the disk cartridge 1, as shown in FIG. 9, unlike the conventional clamping plate in which the location of the rim 73a of the recess 71 (location indicated by a broken line in FIG. 9) is withdrawn toward the outer periphery, the main body 61 is formed such that the rim 73a is formed at a prescribed location. As a result, even if the foremost end of the drive shaft 401 approaches the recess 71 of the clamping plate 6 with the center of the drive shaft 401 of the drive unit and the center of the clamping plate 6 being displaced from each other, the foremost end of the drive shaft 401 is reliably inserted into the recess 71 while the clamping plate 6 is moved such that the center of the drive shaft 401 and the center of the clamping plate 6 become coincident with each other. This makes it possible to reliably prevent the optical disc 100 from being clamped with the center of the clamping plate 6 and the center of the drive shaft 401 being eccentric from each other, or the resulting eccentricity from causing insufficient clamping of the optical disc 100. Subsequently, the drive unit rotates the optical disc 100 at a predetermined rotational speed. After that, a laser beam is irradiated through the openings 3a and 4a (for recording or reproducing of data).

As described above, according to the clamping plate 6, the cartridge case 2, and the disk cartridge 1, at the imaginary intersecting portion 77 between the imaginary extended surface 75b of the rear surface 75a of the outer peripheral portion 75 of the main body 61 and the imaginary extended surface 72b of the rear surface 72a of the inner peripheral wall 72 of the main body 61, the annular groove 78 recessed from the imaginary extended surfaces 75b and 72b in the directions of the thicknesses of the outer peripheral portion 75 and the inner peripheral wall 72 is formed along the imaginary line 77a of intersection of the imaginary extended surfaces 75b and 72b, whereby it is possible to make the portion of the magnetic metal plate 300 formed with the groove 78 thinner than the other portion of the magnetic metal plate 300 by the depth of the groove 78, and hence it is possible to easily deform the portion formed with the groove 78. This makes it possible to accurately trace the shape of the corner 223 of the upper mold 203 onto the magnetic metal plate 300, whereby the main body 61 can be formed such that the rim 73a of the recess 71 of the main body 61 is formed at a prescribed location which is not withdrawn toward the outer periphery (toward the protrusion 76) of the main body 61. Therefore, e.g., even if the foremost end of the drive shaft 401 approaches the recess 71 of the clamping plate 6 with the center of the drive shaft 401 of the drive unit and the center of the clamping plate 6 being displaced from each other, the foremost end of the drive shaft 401 can be inserted into the recess 71 while the clamping plate 6 is moved such that the center of the drive shaft 401 and the center of the clamping plate 6 become coincident with each other. This makes it possible to reliably prevent the optical disc 100 from being clamped with the center of the clamping plate 6 and the center of the drive shaft 401 being eccentric from each other, and the resulting eccentricity from causing insufficient clamping of the optical disc 100.

Further, according to the clamping plate 6, the cartridge case 2, and the disk cartridge 1, the groove 78 is formed such that the groove width thereof is gradually reduced toward the bottom of the groove 78, whereby compared e.g., with a construction in which the groove 78 is formed to have a shape rectangular in cross section and a uniform groove width, it is possible to enhance the strength of the portion (rim 73a of the opening 73) of the main body 61, which is formed with the groove 78.

Further, according to the clamping plate 6, the cartridge case 2, and the disk cartridge 1, the groove 78 is formed such that the maximum depth thereof is within a range of 10% to 50% of the thickness of the portion of the main body 61 other than the portion thereof formed with the groove 78, whereby it is possible to form the main body 61 such that it has a thickness small enough to facilitate deformation of the magnetic metal plate 300 by pressing, and at the same time large enough to secure a sufficient strength of the portion (rim 73a of the opening 73) of the main body 61, which is formed with the groove 78.

Further, according to the mold 201 and the method of manufacturing the clamping plate, at the imaginary intersecting portion 214 of the imaginary extended surface 211a of the forming surface 211 and the imaginary extended surface 212a of the forming surface 212, the protrusion 213 protruding obliquely outward from the imaginary extended surfaces 211a and 212a is formed along the imaginary line 214a of intersection of the imaginary extended surfaces 211a and 212a. This protrusion 213 is pressed against the magnetic metal plate 300, whereby the clamping plate 6 is manufactured. Since this makes it possible to form the annular groove 78 at the imaginary intersecting portion 77 of the main body 61 of the clamping plate 6, the portion of the magnetic metal plate 300 formed with the groove 78 can be made thinner than the other portion of the magnetic metal plate 300 by the depth of the groove 78, whereby it is possible to easily deform the portion formed with the groove 78. Further, it is possible to press in a portion of the magnetic metal plate 300 against which the protrusion 213 is pressed, toward the corner 223 of the upper mold 203 by a strong force. This makes it possible to accurately trace the shape of the corner 223 of the upper mold 203 onto the magnetic metal plate 300, whereby the main body 61 can be formed such that the rim 73a of the opening 73 of the clamping plate 6 is formed at a prescribed location which is not withdrawn toward the outer periphery (toward the protrusion 76) of the main body 61. Therefore, e.g., even if the foremost end of the drive shaft 401 approaches the recess 71 of the clamping plate 6 with the center of the drive shaft 401 of the drive unit and the center of the clamping plate 6 being displaced from each other, the foremost end of the drive shaft 401 can be inserted into the recess 71 while the clamping plate 6 is moved such that the center of the drive shaft 401 and the center of the clamping plate 6 become coincident with each other. This makes it possible to reliably prevent the optical disc 100 from being clamped with the center of the clamping plate 6 and the center of the drive shaft 401 being eccentric from each other, and the resulting eccentricity from causing insufficient clamping of the optical disc 100.

It should be noted that the present invention is by no means limited to the above-described embodiment. For example, although in the above-described embodiment, the description has been given, by way of example, of the groove 78 having a trapezoid-like shape in cross section, this is not limitative, but the groove 78 can be configured to have a desired shape, such as a semicircular shape or a semi-elliptic shape, in cross section. Further, the groove 78 can be configured to have a rectangular shape in cross section. Further, it is also possible to configure a portion of the magnetic metal plate 300 around the portion formed with the groove 78 such that the portion has a thickness gradually reduced toward the groove 78. Further, the disk-shaped recording medium according to the present invention is not limited to the aforementioned rewritable optical disc 100, but it includes not only various optical discs, such as a reproduction-only optical disc and a write-once type optical disc, but also a magneto-optical disk and a magnetic disk.

What is claimed is:

1. A clamping plate for a disk-shaped medium driven by a disk drive, including a main body comprising:

a recess circular in plan view formed in a central portion thereof, the recess having an inner peripheral wall inclined such that the recess is gradually reduced in diameter from an opening toward a bottom thereof; and an outer peripheral portion formed by an annular plate body such that the outer peripheral portion surrounds the opening, wherein the main body has a groove formed at an imaginary intersecting portion between an imaginary extended surface of a rear surface of the outer peripheral portion and an imaginary extended surface of a rear surface of the inner peripheral wall, along an imaginary line of intersection of the two imaginary extended surfaces, the groove being recessed from the two imaginary extended surfaces.

2. A clamping plate according to claim 1, wherein the groove is formed such that the groove is gradually reduced in groove width toward the bottom.

3. A clamping plate according to claim 1, wherein the groove is formed such that a maximum depth thereof is within a range of 10% to 50% of a thickness of a portion of the main body other than a portion thereof formed with the groove.

4. A cartridge case comprising:

the clamping plate as claimed in claim 1; and a case body configured to rotatably accommodate a disk-shaped medium, the case body having the clamping plate rotatably disposed on a top surface thereof.

5. An information medium comprising:

the cartridge case as claimed in claim 4; and the disk-shaped medium accommodated in the cartridge case.

6. A mold for manufacturing a clamping plate by pressing a plate material, the clamping plate including a main body comprising:

a recess circular in plan view formed in a central portion thereof, the recess having an inner peripheral wall inclined such that the recess is gradually reduced in diameter from an opening toward a bottom thereof; and an outer peripheral portion formed by an annular plate body such that the outer peripheral portion surrounds the opening, wherein the mold comprises a first forming surface that forms a rear surface of the outer peripheral portion, and a second forming surface that forms a rear surface of the inner peripheral wall, and wherein the mold has a protrusion formed at an imaginary intersecting portion of an imaginary extended surface of the first forming surface and an imaginary extended surface of the second forming surface, along an imaginary line of intersection of the two imaginary extended surfaces, the protrusion protruding from the two imaginary extended surfaces.

7. A method of manufacturing a clamping plate by pressing a plate material, the clamping plate including a main body comprising:

a recess circular in plan view formed in a central portion thereof, the recess having an inner peripheral wall inclined such that the recess is gradually reduced in diameter from an opening toward a bottom thereof; and an outer peripheral portion formed by an annular plate body such that the outer peripheral portion surrounds the opening, wherein the clamping plate is manufactured by pressing a protrusion of a mold against the plate material, the mold comprising a first forming surface that forms a rear surface of the outer peripheral portion, and a second forming surface that forms a rear surface of the inner peripheral wall, the protrusion being formed at an imaginary intersecting portion of an imaginary extended surface of the first forming surface and an imaginary extended surface of the second forming surface, along an imaginary line of intersection of the two imaginary extended surfaces, the protrusion protruding from the two imaginary extended surfaces.

* * * * *